United States Patent [19]

Beck

[11] Patent Number: 4,597,859

[45] Date of Patent: Jul. 1, 1986

[54] ADJUSTABLE VORTEX CLASSIFIER

[75] Inventor: Jeffrey L. Beck, Ponca City, Okla.

[73] Assignee: Conoco Inc., Ponca City, Okla.

[21] Appl. No.: 660,823

[22] Filed: Oct. 15, 1984

[51] Int. Cl.[4] .......................... B04C 7/00; B01D 21/26

[52] U.S. Cl. .................................... 209/211; 209/210; 209/144; 210/512.1; 210/512.3

[58] Field of Search ............... 209/211, 210, 144, 143; 210/512.1, 512.3, 787, 788; 55/261

[56] References Cited

U.S. PATENT DOCUMENTS

| | | | |
|---|---|---|---|
| 2,917,173 | 12/1959 | Rakowsky | 209/211 X |
| 3,195,241 | 7/1965 | Hohne | 55/261 X |
| 4,198,290 | 4/1980 | Summers | 209/144 |
| 4,276,119 | 6/1981 | Karnis et al. | 209/211 X |
| 4,334,986 | 6/1982 | Frykhult | 209/17 |
| 4,409,746 | 11/1983 | Beck | 406/96 |
| 4,444,229 | 4/1984 | Beck | 210/512.1 X |
| 4,449,862 | 5/1984 | Beck | 406/93 |

FOREIGN PATENT DOCUMENTS 1234904 6/1971 United Kingdom .

*Primary Examiner*—S. Leon Bashore

*Assistant Examiner*—Thomas M. Lithgow

*Attorney, Agent, or Firm*—William J. Miller; Cortlan R. Schupbach

[57] ABSTRACT

A method and apparatus for classifying particles which essentially comprise a circular chamber with first and second ends. A high pressure inlet is mounted tangentially to the side of the circular chamber and a high pressure outlet is, likewise, mounted tangentially to the chamber. A low pressure inlet and outlet are mounted to the end of the chamber. The second end is adjustable toward or away from the first end. When a high pressure fluid is communicated to the high pressure inlet and high pressure fluid is removed from the high pressure outlet, a certain portion of the high pressure will be moving toward the low pressure outlet. The particles to be separated are injected axially into the chamber. If the particles are of sufficient weight, they will move by centrifugal force to the high pressure outlet. The remaining particles will move because of the drag created by the fluid moving from the high pressure inlet to the low pressure outlet to separate the heavy particles from the light particles. Movement of the end plate will change the drag force thus changing the particle size separation.

13 Claims, 7 Drawing Figures

ADJUSTABLE VORTEX CLASSIFIER

BRIEF DESCRIPTION OF THE PRIOR ART

The best prior art known to Applicant is Applicant's U.S. Pat. No. 4,449,862 which is a vortex apparatus having a tangential high pressure inlet with a tangential high pressure outlet mounted to a circular chamber. A low pressure inlet and outlet are mounted axially to one end of the chamber. This apparatus does not disclose a means for selectively separating the particles even though some separation will take place.

U.S. Pat. No. 4,334,986 issued to Rune H. Frykhult discloses a separator for a mixture of a suspension and coarse heavy particles. This separator does not disclose any means for varying the degree of separation between heavy and light particles.

Great Britain Pat. No. 1,234,904 issued to Canadian Patents and Development Limited discloses a vortex separator used in combination with a series of other separators. The separation is determined primarily by additional apparatus connected to the vortex separator and not by any adjustment of the vortex separator itself.

BRIEF DESCRIPTION OF THE INVENTION

This invention describes an adjustable vortex classifier constructed from a chamber having a substantially cylindrical side wall with a first end enclosed and attached to one edge of the side wall. A first inlet extends coaxially to the chamber through the first end. A first outlet, likewise, extends coaxially to the chamber through the said first end. A high pressure inlet is mounted tangentially to said chamber through the side wall and a high pressure outlet is mounted tangentially to the side wall of the chamber. In order to vary the classification of particles being transferred from the low pressure inlet to the high pressure outlet, a second adjustable wall is attached to the remaining edge of the cylindrical side wall. The second end is adjustable by one of several means. One means is to form the end into a piston which can be mechanically moved toward or away from the first end, thus varying the distance between the first and second end. As the distance gets less, the particle size being transferred from the low pressure inlet to the high pressure outlet will increase, assuming the weight per unit volume of the particles is substantially the same. The distance between the end walls can also be varied by mounting a diaphragm as the second end and forcing the diaphragm toward the first end either mechanically or hydraulically.

DETAILED DESCRIPTION OF THE FIGURES

Figures 1, 2, 4, 5:
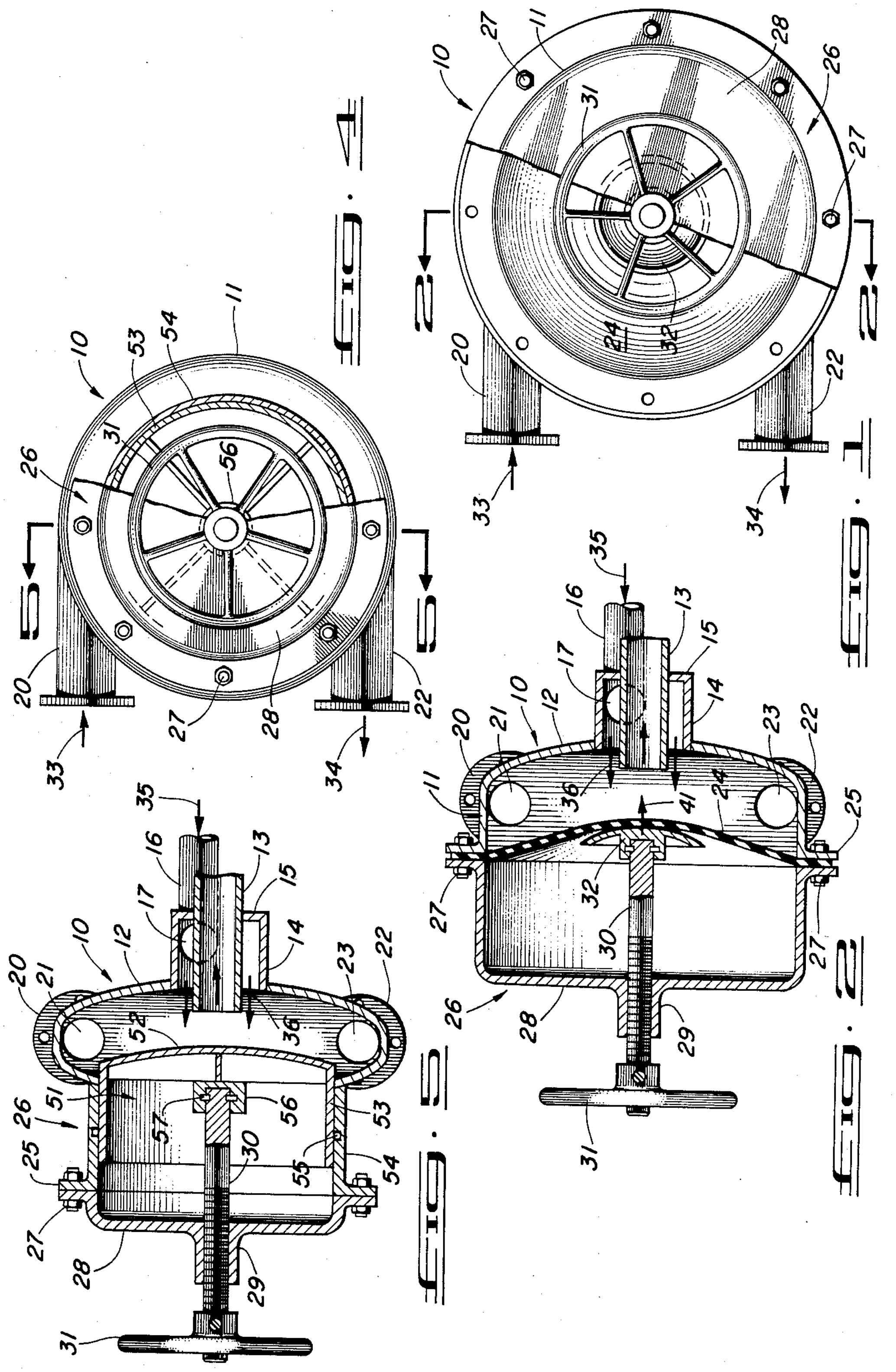
FIG. 1 is a top view in partial section of a mechanical method for moving the second end toward the first.
FIG. 2 is a cross-sectional view of the apparatus illustrated in FIG. 1 taken through lines 2—2.
FIG. 4 is a top view in partial section where the second end is formed from a piston.
FIG. 5 is a cross-section of the apparatus illustrated in FIG. 4 taken through lines 5—5.

Referring to all of the Figures but in particular to FIGS. 1 and 2, a mechanically controlled classifier is illustrated and generally comprises a chamber referred to by arrow 10 having a substantially circular side wall 11 and a first end 12. A low pressure outlet 13 is mounted coaxially through the first end and a low pressure inlet 14 is, likewise, mounted coaxially through the first end. Low pressure outlet 13 is attached to low pressure inlet 14 through a disc-haped plate 15 and appropriately welded thereto. An inlet pipe 16 is attached to low pressure inlet 14 at port 17. A high pressure inlet 20 is mounted tangentially to side wall 11 and enters chamber 10 through port 21. A high pressure outlet pipe 22 is mounted tangentially to side wall 11 and communicates with chamber 10 through port 23.

The second adjustable end comprises a flexible diaphragm 24 which is attached to a flange 25 of side wall 11 by end cap 26 using bolts 27. End cap 26 has a top portion 28 which includes an axially threaded portion 29. A threaded bolt 30 passes through axially threaded portion 29 and has a handle 31 attached at one end and a pressure plate 32 attached at the other end which is in communication with diaphragm 24.

OPERATION

The apparatus of FIGS. 1 and 2 operates in the following manner.

A high pressure fluid enters along the direction of arrow 33 and leaves along the direction of arrow 34. Low pressure fluid, including material to be separated, enters in the direction of arrow 35 into pipe 16 and through port 17, flowing in the direction of arrow 36 into chamber 10.

Figure 7:
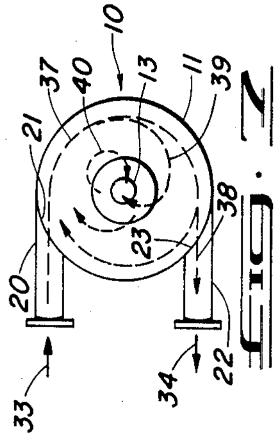
FIG. 7 is an illustration used to describe the operation of the apparatus.

Referring to FIG. 7, material flowing in the direction of arrow 33 enters high pressure pipe 20 into chamber 10 through port 21 and moves in the direction of dotted line 37. Some of the fluid continues around chamber 10 in the direction of dotted line 38 and moves out of outlet 22 through port 23 in the direction of arrow 34. Some of the material moves in the direction of dotted line 39 to outlet pipe 13. When material is injected from pipe 16 into chamber 10, if it is sufficiently heavy, it will overcome the drag created by the flow of fluids along dotted line 39 toward outlet 13. If the drag is overcome, centrifugal force will move the particles to the outside wall of chamber 10 where the fluid along dotted line 38 will carry the heavy material out outlet 22. Lighter material will be more influenced by drag and thus will follow the drag line path 40 moving from pipe 16 into chamber 10 and directly out of the chamber through pipe 13. The heavier the material the further into chamber 10 it will migrate; however, it will not exit pipe 22 if its weight is more influenced by drag than centrifugal force. The ratio of drag to centrifugal force in this invention can be changed by moving handle 31 so that threaded bolt 30 moves pressure plate 32 in the direction of arrow 41. Thus, if handle 31 is rotated to move pressure plate 32 in the direction of arrow 41, the dimension between diaphragm 24 and end 12 will decrease. This feature will change the ratio of centrifugal force to the drag, increasing the drag in proportion to the centrifugal force. As a consequence the closer diaphragm 24 is to end 12, the higher the drag in proportion to the centrifugal force and thus the separation will provide larger dimensioned fines to outlet 13 and larger particles toward outlet 23. It is obvious, of course, that movement of diaphragm 24 away from end 12 will cause the reverse action.

All of the remaining embodiments operate in the exact same way so the operation of the remaining embodiments will not be discussed in regard to the separation of the particles.

Figure 3:
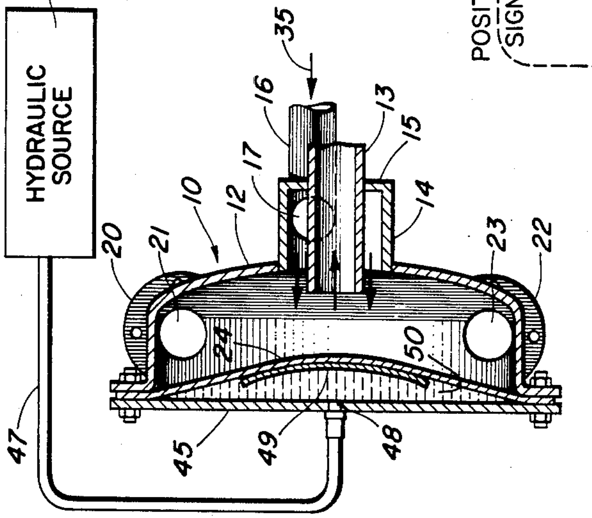
FIG. 3 is a cross-sectional view of the apparatus where the second end is a diaphragm and where the moving force of the diaphragm is a hydraulic source.

In FIG. 3, diaphragm 24 is mounted in exactly the same way as diaphragm 24 in FIG. 2. In this instance, however, an end plate 45 is substituted for end cap 26. A hydraulic source 46, which could be a cylinder full of hydraulic fluid, is coupled through pipe 47 to port 48. A stiffening member 49 can be attached to diaphragm 24. Any number of stiffening members can be attached to diaphragm 24 to prevent diaphragm 24 from undulating as the fluids are injected from pipe 16 into chamber 10 and from pipe 20 into chamber 10. It should also be noted that, while diaphragm 24 is shown to be elastic, such as rubber, urethane, or other flexible material, it could just as easily be a concentrically corrugated metal diaphragm. The apparatus operates by hydraulic source 46 forcing hydraulic fluid down pipe 47 out port 48 and filling space 50 between diaphragm 24 and end plate 45. Obviously, the greater the quantity of hydraulic fluid filling space 50, the closer diaphragm 24 will approach end 12.

Referring to FIGS. 4 and 5, a third mechanical embodiment is illustrated where the diaphragm consists of a piston generally referred to by arrow 51 and comprises an end portion 52 attached to cylindrical side walls 53. End cap 26 comprises a cylinder wall 54 with a seal 55 which may be an O-ring or other type seal mounted in a groove circumferentially around the inside of cylindrical wall 54. Seal 55 can, alternatively, be on the outside of side walls 53. Top 28, as previously discussed, has the axially threaded portion 29 attached thereto with bolt 30 passing through threaded portion 29 and handle 31 attached at one end with a coupling member 56 attached to end portion 52. The piston is moved toward or away from end 12 in exactly the same manner as described in FIGS. 1 and 2, except that bolt 30 is coupled to slidable piston 51. When handle 31 is rotated in one direction, piston 51 will move toward end 12; and, when rotated in the opposite directiion, piston 51 will move away from end 12. In order to prevent decoupling of the bolt 30 from coupling member 56, it is obvious that bolt 30 must rotate with respect to coupling member 56 but must be locked thereto by a clip 57, for example.

AUTOMATIC CONTROL

Figure 6:
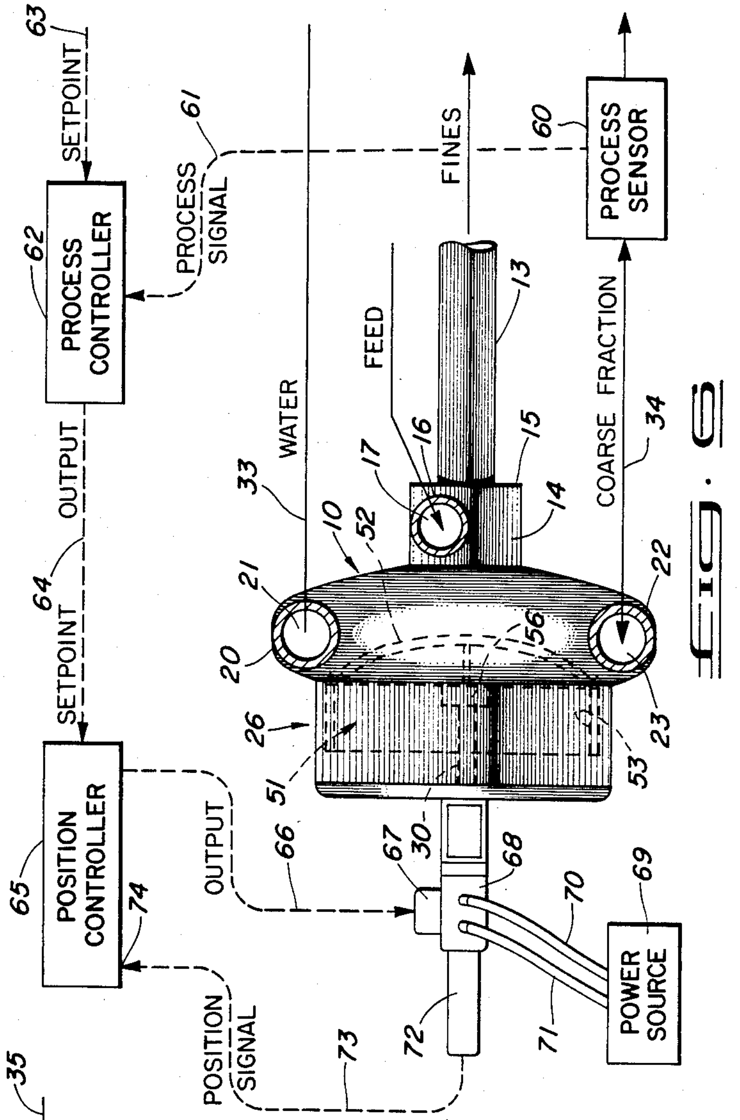
FIG. 6 is a drawing illustrating a process control system used to control the classifier apparatus.

The preferred embodiment incorporates an automatic control as illustrated in FIG. 6. The apparatus illustrated will provide a selection of particle sizes being outputted from pipe 22 and pipe 16. In order to provide such a selection, a process sensor 60 is coupled to pipe 22. Process sensor 60 can be a particle size distribution analyzer. Devices for measuring size distribution are well known in the art and will not be further described. A signal from process sensor 60 is transmitted through communication means 61 as a process signal to the input of process controller 62. The separation is determined by input 63 to process controller 62, providing a set point for process controller 62. Such a set point can be a voltage, such as a d.c. voltage. Process controller 62 developes an output which is communicated through means 64 as an additional set point to a position controller 65. Position controller 65 developes an output through means 66 which is coupled to an input control valve 67 of a hydraulic actuator. Input control valve 67 can be any electrical or electrohydraulic control valve. Such control valves are well known and will not be further described. The output from valve 67 is converted from means 66 to a hydraulic control for hydraulic actuator 68. A hydraulic power source 69 has an input 70 and a return 71 coupled between power source 69 and hydraulic actuator 68 the hydraulic actuator 68 is coupled to a piston arrangement identical to that illustrated in FIG. 5 which includes shaft 30 connected to piston 51 through coupling 56.

A position sensing apparatus 72 is connected to hydraulic actuator 68 and developes an output through means 73 to the input 74 of position controller 65.

As previously described, water is inputted at a high pressure into pipe 20 and feed water, including the material to be separated, is inputted into pipe 16. The automatic system operates in the following manner. Feed, which includes water and the material to be separated, is inputted into pipe 16 where it enters chamber 10. As previously discussed, the high pressure water will enter pipe 20 and exit pipe 22 along with the separated coarse material. Fluid, such as water including the separated fines, will exit pipe 13. The coarse fraction from pipe 22 is passed through process sensor 60 where size of the coarse material is measured. The measurement determined by process sensor 60 is communicated through means 61 to process controller 62. Set point 63 has been determined, thus process controller 62 will develop output through means 64 to position controller 65 and which will determine the set point of position controller 65. Any change in the output signal from controller 62 will cause a set point change in position controller 65 through means 64. Any change in the set point of position controller 65 will cause a corresponding change in the output through means 66 to electrohydraulic valve 67. Hydraulic control 68 will then make an appropriate movement (either toward or away from) end 12 moving shaft 30 and attached piston 51 to accommodate the necessary correction as in particle distribution as detected by process sensor 60.

A feedback signal from position sensing apparatus 72 signals, through means 73, any change in the position of hydraulic control 68. Such signal is applied to the input 74 to position controller where the signal is used as a feedback input well known in the art. It is obvious that process sensor 60 may be incorporated in the fines output pipe 13 rather than the coarse fraction output in a similar manner. Additional feedback signals may be incorporated wherever necessary and still be within the scope of the invention.

In the description of the invention, only some of the many means for positioning a diaphragm 24 or piston 51 have been disclosed. It is obvious that bolt 30 could be a threaded shaft coupled to the output of an electrical motor, a hydraulic motor or any other combination of the above.

It is obvious that changes can be made in the apparatus or method and still be within the spirit and scope of the invention as disclosed in the specification and appended claims.

What is claimed is:

1. An adjustable vortex Classifier for the classification of a slurry containing various size particles mixed in a fluid into a first stream containing fines and a second stream containing the remainder of the particles comprising:

a. chamber having substantially cylindrical side wall with first end enclosing and attached to one edge of said side wall;
b. a first inlet extending coaxially into said chamber through said first end;
c. a first outlet extending coaxially with said first inlet into said chamber;
d. a second inlet extending tangentially into said chamber through said side wall;
e. a second outlet tangentially from said chamber through said side wall;
f. an adjustable second end means attached to and enclosing the remaining edge of said side wall; and
g. means for moving said second end means toward or away from said first end to the extent that a different particle size distribution may be obtained;

whereby the distance between said first and second end can be varied.

2. Apparatus as described in claim 1 wherein said second end means is made of deformable material means and wherein said means for moving said second end means toward or away from said first end comprises pressure variation means applied to said deformable material, external to said chamber.

3. Apparatus as described in claim 2 wherein said pressure variation means comprises a pressure plate mounted against said deformable material means and means for varying the pressure against said pressure plate.

4. Apparatus as described in claim 3 wherein said means for varying the pressure against said pressure plate comprises an axially mounted threaded rod having first and second end and wherein the first end of said threaded rod is in mechanical communication with said pressure plate and said second end of said threaded rod includes means for rotating said threaded rod, and means for threadably attaching said rod to said chamber.

5. Apparatus as described in claim 3, wherein said means for moving said second end means comprises a third end, means for attaching said third end to said side wall to form a second enclosed chamber between said third end and said second end, third inlet means porting into said second chamber to enable the addition of hydraulic fluid into said second chamber, and means for varying the fluid pressure in said second chamber through said third inlet means.

6. Apparatus as described in claim 1 wherein said adjustable second end means comprises:

a. a second cylindrical side wall attached axially to said substantially cylindrical side wall;
b. a piston cylinder slidably and sealably mounted inside said second cylindrical side wall; and
c. wherein said means for moving said second end means comprises means for sliding said piston cylinder toward or away from said first end.

7. Apparatus as described in claim 6 wherein said means for sliding said piston cylinder comprises a threaded rod having first and second ends, said first end of said threaded rod rotatably secured to said piston cylinder, said second end of said threaded rod having attached thereto means for rotating said threaded rod, and mating thread means receiving said threaded rod, and means for securing said mating thread means to said second cylindrical side wall.

8. Apparatus as described in claim 6 wherein said means for sliding said piston cylinder comprises a hydraulic actuator cylinder means with a hydraulic input means and a mechanical output means; means for attaching said hydraulic actuator cylinder means to said second cylindrical side wall; and means for attaching said mechanical output to said piston cylinder.

9. Apparatus as described in claim 1 including:

a. process sensing means for determining the particle sizes from said second outlet and outputting a signal in accordance thereto;
b. process controller means receiving said outputted signal from said process sensing means and outputting a signal in correspondence thereto;
c. position controller means receiving said outputted signal from said process controller and outputting a control signal to said means for moving said second end means; and
d. means for setting said process controller means to a predetermined particle size.

10. Apparatus as described in claim 1 including:

a. process sensing means for determining the particle sizes from said first outlet and outputting a signal in accordance thereto;
b. process controller means receiving said outputted signal from said process sensing means and outputting a signal in correspondence thereto;
c. position controller means receiving said outputted signal from said process controller and outputting a control signal to said means for moving said second end means; and
d. means for setting said process controller means to a predetermined particle size.

11. A method for the classification of a slurry containing various size particles mixed in a fluid into a first stream containing fines and a second stream containing the remainder of the particles, by injecting said slurry axially into a cylindrical volume, injecting a fluid tangentially into said cylindrical volume, removing said second stream tangentially from said cylindrical volume, and removing said first stream axially from said cylindrical volume, and said method further comprising varying the classification of particle size between said first and second stream by changing the axial length of said cylindrical volume until said desired particle size distribution is achieved.

12. The method as described in claim 11 including:

a. measuring the particle sizes in said second stream;
b. determining the desired particle size distribution in said second stream; and
c. adjusting the axial length of said cylinder volume until said determined particle size distribution is achieved.

13. The method as described in claim 11 including:

a. measuring the particle sizes in said first stream;
b. determining the desired particle size distribution in said first stream; and
c. adjusting the axial length of said cylindrical volume until said determined particle size distribution is achieved.

* * * * *